United States Patent [19]

Yirmiyahu et al.

[11] Patent Number: 4,760,644
[45] Date of Patent: Aug. 2, 1988

[54] HYDRAULIC CUTTER

[76] Inventors: Benyamin Yirmiyahu, Maimon 52, Bnei Brak, Israel; Mordechai Yirmiyahu, Anzio Serani 17, Givatayim, Israel

[21] Appl. No.: 877,920

[22] Filed: Jun. 24, 1986

[51] Int. Cl.[4] .............................................. B23D 29/02
[52] U.S. Cl. ........................................ 30/180; 30/187
[58] Field of Search ................ 30/175, 180, 186, 187, 30/188

[56] References Cited

U.S. PATENT DOCUMENTS

| | | | |
|---|---|---|---|
| 492,931 | 3/1893 | Baird | 30/180 |
| 770,270 | 9/1904 | Dehn | 30/180 |
| 3,372,479 | 3/1968 | Fischer | 30/180 |
| 3,888,003 | 6/1975 | Brown | 30/180 |
| 4,031,613 | 6/1977 | Gregory | 30/180 |

FOREIGN PATENT DOCUMENTS

| | | | |
|---|---|---|---|
| 2310098 | 9/1974 | Fed. Rep. of Germany | 30/187 |
| 1812109 | 12/1977 | Fed. Rep. of Germany | 30/180 |

*Primary Examiner*—E. R. Kazenske
*Assistant Examiner*—Michael D. Folkerts
*Attorney, Agent, or Firm*—Benjamin J. Barish

[57] ABSTRACT

A hydraulic cutter comprising a pair of blades held by arms extending from a hydraulic piston, said blades being pivotally associated with one another, and having cutting edges at one end and rounded edges at the other end thereof; and said piston comprising an arrow-shaped piston head adapted to wedge between the blades and separate them near their rounded edges as the piston extends along its axis, thereby forcing the cutting edges to close.

5 Claims, 2 Drawing Sheets

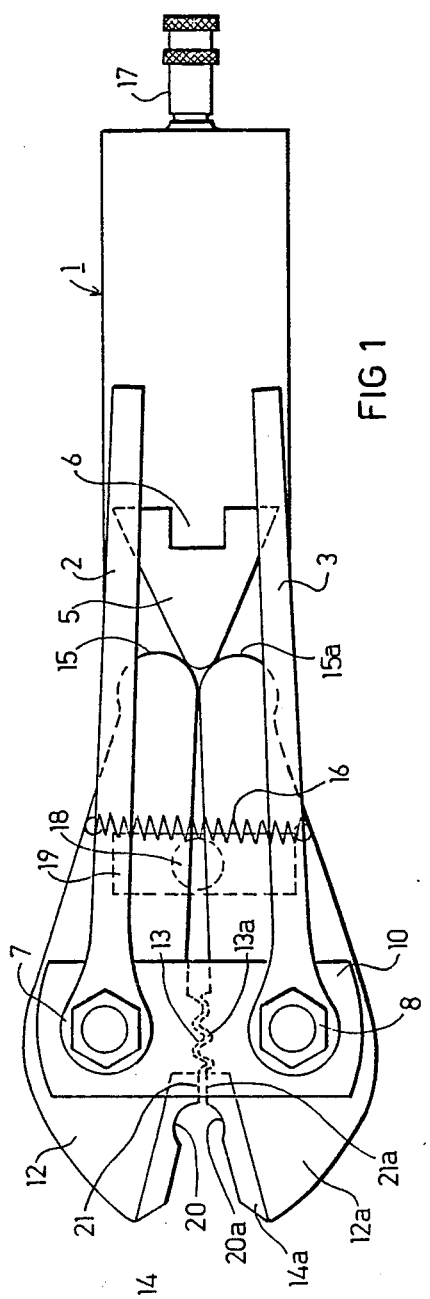
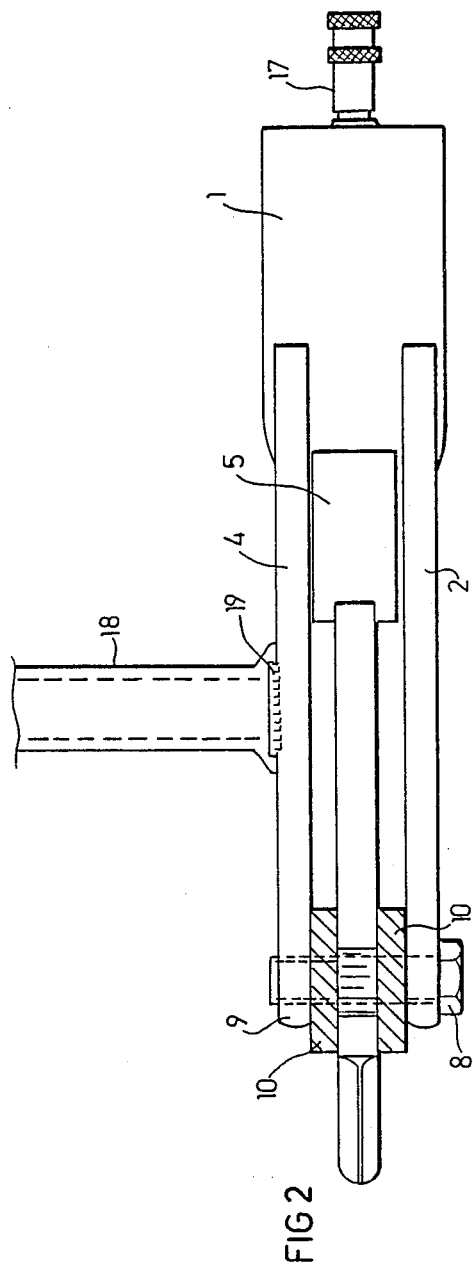
FIG 1
FIG 2

HYDRAULIC CUTTER

FIELD OF THE INVENTION

The present invention concerns a hydraulic cutter.

BACKGROUND OF THE INVENTION

Such a cutter is intended for cutting tempered steel bars up to a thickness of about 16 mm, and regular steel bars up to a thickness of about 20 mm. The tool of this invention is particularly useful in combination with a hand-operated hydraulic pump, since it can be handled by a single person because of its relatively light weight.

BRIEF SUMMARY OF THE INVENTION

The present invention comprises a hydraulic cutter comprising a pair of blades held by arms extending from a hydraulic piston, said blades being pivotally associated with one another, and having cutting edges at one end and rounded edges at the other end thereof; and said piston comprising an arrow-shaped piston head adapted to wedge between the blades and separate them near their rounded edges as the piston extends along its axis, thereby forcing the cutting edges to close.

More particularly, the invention provides a hydraulic cutter comprising a housing; a first pair of arms secured at one end to one side of the housing and extending therefrom in parallel spaced relationship;; and a second pair of arms secured at one end to the opposite side of the housing and extending in parallel spaced relationship to each other and to the first pair of arms. The device further comprises a first plate fixed by a pair of pins to, and transversely across, the ends of the first pair of arms; and a second plate fixed by the pairs of pins to and transversely across, the opposite ends of the second pair of arms. A pair of jaws are pivotably mounted to the pair of pins between the transversely extending plates. Each of the jaws is formed with a rounded cam surface at the end facing the housing, and with a cutting edge at the opposite end. A spring is connected to the pair of jaws between their pivotal mountings and their rounded ends for urging apart their cutting edges. The device further includes means for inletting a hydraulic fluid into the housing, and a piston of triangular configuration having a head extending from the housing and movable towards the jaws. The piston head is engageable with the rounded cam surfaces of the pair of jaws to cam them apart, thereby forcing the cutting edges of the jaws towards each other, upon the movement of the piston towards the jaws when the hydraulic fluid is inletted into the housing.

Such a construction permits the cutter to be made of relatively light weight which can be handled by a single person to cut relatively thick steel bars.

The preferred embodiment of the invention described below includes meshing teeth formed on the facing surfaces of the pair of jaws adjacent to their pivotal mountings. In addition, the pivotable jaws include arched sections, and also abutting sections, on their facing surfaces between their cutting edges and their pivotable mountings.

BRIEF DESCRIPTION OF THE DRAWINGS

The invention will now be described in more detail with reference to the following figures, in which:

FIG. 1 represents a side view of the cutting tool.
FIG. 2 represents a top view of the cutting tool.

DESCRIPTION OF THE PREFERRED EMBODIMENT

Figure 3:
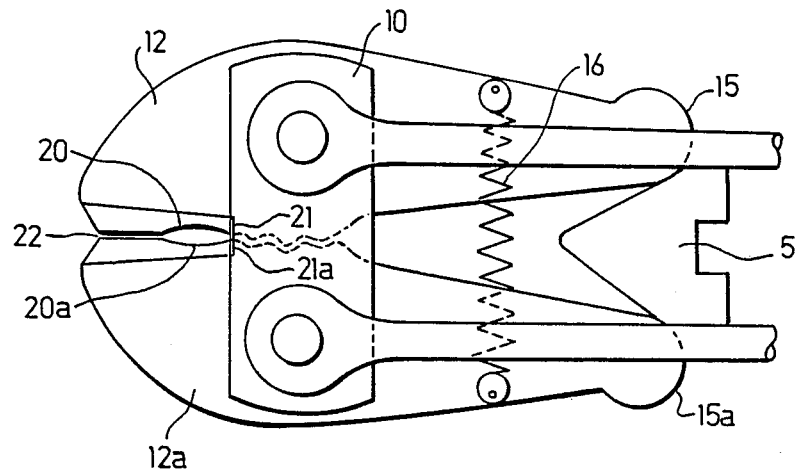
FIG. 3 represents a side view of the blades in a closed position.
Figure 4:
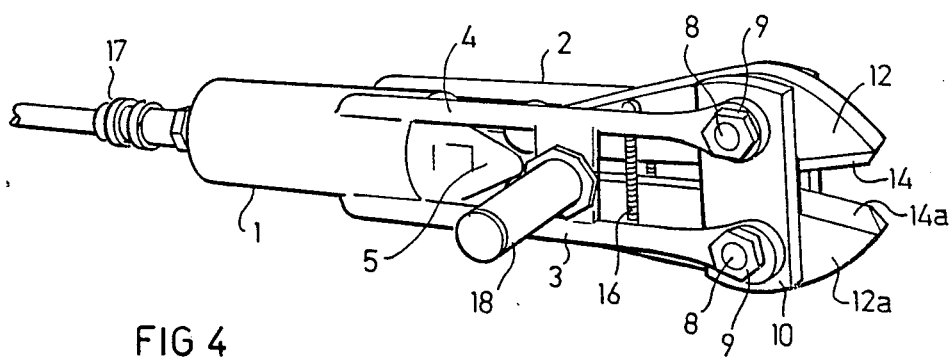
FIG. 4 is a perspective view of the cutter.

Referring now to the drawings, the hydraulic cutter comprises a hydraulic piston having a housing 1 to which are integrally attached first pair of arms 2, 3 secured at one end to one side of housing 1 to extend therefrom in parallel relationship; and a second pair of arms 4,4' secured at one end to the opposite side of housing 1 and extending therefrom in parallel spaced relationship, and also parallel to the first pair of arms 2, 3. A piston head 5 having a triangular shape in the form of an arrow head is mounted on the piston 6 coming out of housing 1 and fits between the arms 2 and 4 (see FIG. 2). The arms terminate in loops 7. Cutting blades 12 and 12a pivotably engage each other along the respective teeth 13 and 13a, each cutting blade having at one end angled cutting edges 14 and 14a, and at the other end rounded edges 15 and 15a respectively. These blades are pivotably mounted to the four arms 2, 3, 4, 4' by threaded pins or bolts 8, and nuts 9. Plates 10 are inserted between the blades and the arms to maintian the blades in a fixed position pivotally along teeth 13 and 13a. Spring 16 connects the blades 12 and 12a thereby holding the cutting edges in an initial open position.

A handle 18 is attached to one side of the cutter by means of a plate 19, which is attached to two arms 2 and 3.

When hydraulic fluid enters the hydraulic cutter from a hydraulic pump (not shown) via coupling 17, it pushes the piston head 5 forward. The triangular piston head 5 wedges between the rounded edges 15 and 15a of the blades, and pries these blades apart from one another. This causes the cutting edges 14 and 14a to close on each other pivotally around engaged teeth 13 and 13a. Holding plates 10 assure that the blades do not separate under the pressure exerted by the force of the piston head 5, and that their spacial distance around the pivotal point of the teeth 13 and 13a is maintained.

When the hydraulic fluid is withdrawn, the piston head 5 withdrasw into housing 1, and the spring 16 contracts, drawing the rounded edges of the blades towards one another, thereby opening the cutting edges 14 and 14a.

The cutting edges, it will be noted, have a special design in that they comprise arched cutting sections 20 and 20a towards the rear part of the cutting edge. The blades furthermore comprise abutting non-cutting flat sections 21 and 21a between the arched sectins 20 and 20a and the engaging teeth 13 and 13a. By means of this design, the cutting edges 14 and 14a never close completely even when full pressure is exerted. There will always be a small space 22 between the edges 14 and 14a. This assures that the thin cutting edges will not snap when pressure is applied to close them, since the blades 12 and 12a are situated one on top of another.

We claim:
1. A hydraulic cutter comprising:
a housing;
a first pair of arms secured at one end to one side of said housing and extending therefrom in spaced parallel relationship;
a second pair of arms secured at one end to the opposite side of said housing and extending in parallel spaced relationship to each other and to said first pair of arms;

a first plated fixed by a pair of pins to, and transversely across, the opposite ends of said first pair of arms;

a second plate fixed by said pair of pins to, and transversely across, the opposite ends of said second pair of arms;

a pair of jaws pivotably mounted to said pair of pins between said transversely extending plates;

each of said jaws being formed with a rounded cam surface at the end facing said housing, and with a cutting edge at the opposite end;

a spring connected to the pair of jaws between their pivotal mountings and their rounded ends for urging apart their cutting edges;

means for inletting a hydraulic fluid into said housing; and a piston of triangular configuration having a head extending from said housing and movable towards said jaws, said piston head being engageable with the rounded cam surfaces of the pair of jaws to cam them apart, thereby forcing the cutting edges of the jaws towards each other, upon the movement of said piston towards said jaws when said hydraulic fluid is inletted into said housing.

2. The hydraulic cutter according to claim 1, further including a handle attached to one pair of said arms, said handle extending from one side of the cutter.

3. The hydraulic cutter according to claim 1, further including meshing teeth formed on the facing surfaces of the pair of jaws adjacent to their pivotal mountings.

4. The hydraulic cutter according to claim 1, wherein said pivotable jaws include arched sections on their facing surfaces between their cutting edges and their pivotable mounting.

5. The hydraulic cutter according to claim 1, wherein said pivotable jaws include abutting sections on their facing surfaces between their cutting edges and their pivotable mountings.

* * * * *